United States Patent [19]

Henk

[11] 4,329,282
[45] May 11, 1982

[54] FLUORO-TRIAZINE-CONTAINING FIBRE-REACTIVE DISAZO DYESTUFFS

[75] Inventor: Hermann Henk, Cologne, Fed. Rep. of Germany

[73] Assignee: Bayer Akteingesellschaft, Leverkusen, Fed. Rep. of Germany

[21] Appl. No.: 926,078

[22] Filed: Jul. 19, 1978

[30] Foreign Application Priority Data

Jul. 22, 1977 [DE] Fed. Rep. of Germany ........ 2733109
Feb. 1, 1978 [DE] Fed. Rep. of Germany ....... 2804248

[51] Int. Cl.³ ...................... C09B 43/12; C09B 43/16
[52] U.S. Cl. .................................................. 260/153
[58] Field of Search ............................ 260/153, 146 T

[56] References Cited

U.S. PATENT DOCUMENTS 3,169,953 2/1965 Gunst ................................ 260/153
3,758,470 9/1973 Ackermann et al. ............ 260/153 X
3,966,705 6/1976 Oesterlein et al. .................. 260/153
4,115,378 9/1978 Bien et al. ....................... 260/153 X

FOREIGN PATENT DOCUMENTS 2657341 6/1977 Fed. Rep. of Germany .
1536706 12/1978 United Kingdom .

Primary Examiner—Helen M. S. Sneed
Attorney, Agent, or Firm—Sprung, Horn, Kramer & Woods

[57] ABSTRACT

Fibre-reactive disazo dyestuffs of the formula

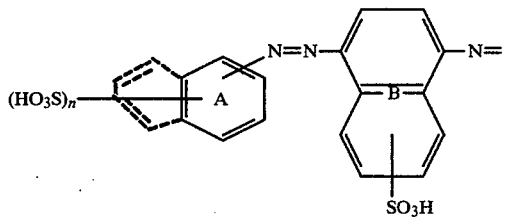

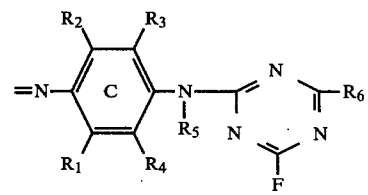

wherein
$R_1$ to $R_4$, $R_5$, $R_6$ and n have the meaning indicated in the description
and their use for dyeing and printing materials containing hydroxyl groups and materials containing amide groups, in particular textile materials.

3 Claims, No Drawings

FLUORO-TRIAZINE-CONTAINING FIBRE-REACTIVE DISAZO DYESTUFFS

The present invention relates to disazo dyestuffs of the general formula (1):

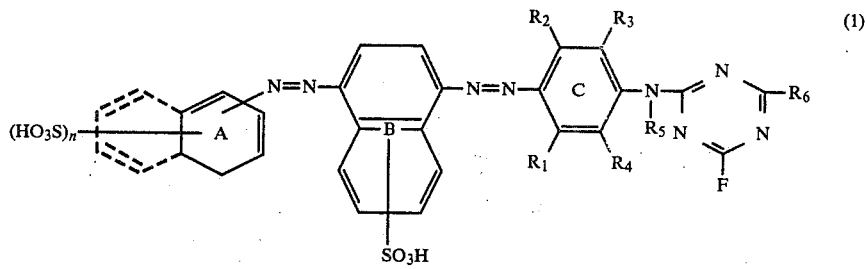

wherein
$R_1$ to $R_4$ independently of one another denote hydrogen, a low-molecular alkyl group or a low-molecular alkoxy group,
$R_5$ denotes hydrogen or a low-molecular alkyl group,
$R_6$ is a substituent,
n is 1, 2 or 3 and
the benzene and/or naphthalene rings A and B can carry further substituents in addition to the sulphonic acid groups.

Examples of suitable substituents $R_6$ are amino groups

or groups —$OR_9$ or —$SR_9$,
wherein
$R_7$ and $R_8$ independently of one another denote hydrogen, low-molecular alkyl, aryl, aralkyl or cycloalkyl, or together form a ring, in particular a 5-membered or 6-membered ring, optionally with the inclusion of one or more hetero-atoms, in particular oxygen, and $R_9$ represents low-molecular alkyl, aryl or aralkyl.

The alkyl, aralkyl and cycloalkyl radicals can contain the customary substituents.

Possible examples for $R_1$ to $R_5$ are: hydrogen, and as a low-molecular alkyl group: methyl-, ethyl-, propyl-, isopropyl-, butyl-, isobutyl-, sec.-butyl- and tert.-butyl-.

As the low-molecular alkoxy group for $R_1$ to $R_4$ there may be mentioned: methoxy-, ethoxy-, propoxy-, isopropoxy-, butoxy-, isobutoxy-, sec.-butoxy- and tert.-butoxy-.

Substituents $R_6$ which are to be mentioned in particular are: amino-, methylamino-, dimethylamino-, ethylamino-, diethylamino-, isopropylamino-, butylamino-, dibutylamino-, sec.-butylamino-, isobutylamino-, diisobutylamino-, tert.-butylamino-, allylamino-, diallylamino-, methoxyethylamino-, sulphatoethylamino-, methoxypropylamino-, ethoxypropylamino-, carboxymethylamino-, N-methyl-N-carboxymethylamino-, carboxyethylamino-, carboxypropylamino-, N-methyl-N-sulphomethylamino-, sulphoethylamino-, N-methyl-N-sulphoethylamino-, cyclohexylamino-, N-methylcyclohexylamino-, N-ethylcyclohexylamino-, dicyclohexylamino-, 2-, 3- or 4-methylcyclohexylamino-, tetrahydro-3-thiopheneamino 1,1-dioxide, pyrrolidino-, piperidino-, 2-methylpiperidino-, hexamethyleneimino-, 1-methylpiperazino-, morpholino-, 4-morpholineamino-, benzylamino, N-methylbenzylamino-, dibenzylamino- and arylamino-.

Aryl here represents, in particular, phenyl or naphthyl, which can be substituted, for example, by sulpho, carboxyl, sulphonamide or carboxamide which is optionally monosubstituted or disubstituted by $C_1$–$C_4$-alkyl, benzyl or phenyl, phenylsulphonylaminosulphonyl or phenylsulphonylaminocarbonyl which is optionally substituted in the phenyl nucleus by $C_1$–$C_4$-alkyl, $C_1$–$C_4$-alkoxy, chlorine, nitro, carboxyl or sulpho, $C_1$–$C_4$-alkylsulphonylaminosulphonyl, $C_1$–$C_4$-alkylsulphonylaminocarbonyl, $C_1$–$C_4$-alkylsulphonyl, phenylsulphonyl which is optionally substituted by $C_1$–$C_4$-alkyl, $C_1$–$C_4$-alkoxy, chlorine, bromine, nitro, sulpho or carboxyl, $C_1$–$C_4$-alkylamino, phenylamino or benzylamino which is optionally substituted by $C_1$–$C_4$-alkyl, $C_1$–$C_4$-alkoxy, chlorine, bromine, nitro, sulpho or carboxyl, nitro, cyano, halogen, such as chlorine and bromine, hydroxyl, $C_1$–$C_4$-alkylcarbonyloxy, benzoyloxy, $C_1$–$C_4$-alkoxy, $C_1$–$C_4$-alkylmercapto, $C_1$–$C_4$-alkyl, phenyl or benzyl which is optionally substituted by $C_1$–$C_4$-alkyl, $C_1$–$C_4$-alkoxy, chlorine, bromine, nitro, sulpho or carboxyl, trifluoromethyl, $C_1$–$C_4$-alkylcarbonylamino, $C_1$–$C_4$-alkylsulphonylamino, or benzoylamino or benzenesulphonylamino which is optionally substituted by $C_1$–$C_4$-alkyl, $C_1$–$C_4$-alkoxy, chlorine, bromine, nitro, sulpho or carboxyl.

Possible radicals for $R_9$ are: methyl-, ethyl-, propyl-, isopropyl-, butyl-, isobutyl-, sec.-butyl-, tert.-butyl-, benzyl- and aryl-.

Aryl here represents, in particular, phenyl or naphthyl, which can be substituted, for example as $R_6$.

Benzene radicals A preferably contain one or two sulphonic acid groups and can be further substituted, for example by $C_1$–$C_4$-alkyl, $C_1$ to $C_4$-alkoxy, carboxyl, halogen, in particular chlorine, $C_1$–$C_4$-alkylcarbonylamino or benzoylamino groups.

If A is a naphthalene radical, it can carry the azo bridge in the 1-position or 2-position and is preferably substituted by one to three sulphonic acid groups.

If the radical B contains further substituents, these are preferably $C_1$–$C_4$-alkoxy groups in the ring carrying the azo bridges.

Preferred dyestuffs are those of the general formula (2):

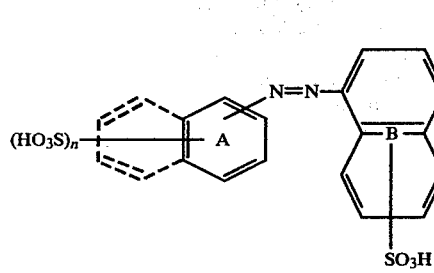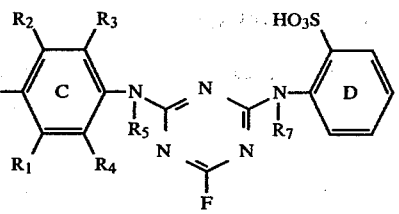

wherein $R_1$ to $R_5$, n and A to C have the abovementioned meaning, $R_7$ denotes hydrogen or a low-molecular alkyl group and the benzene radical D can carry a further sulphonic acid group or carboxyl group, in addition to the sulphonic acid group in the 2-position, and can be further substituted, for example by $C_1$–$C_4$-alkyl, $C_1$–$C_4$-alkoxy, halogen, in particular chlorine, $C_1$–$C_4$-alkylcarbonylamino or benzoylamino groups.

Preferred dyestuffs are those in which A is a phenyl radical which contains one or two sulphonic acid groups and which can also be substituted by $C_1$ to $C_4$-alkyl, $C_1$ to $C_4$-alkoxy, carboxyl, halogen, in particular chlorine, $C_1$–$C_4$-alkylcarbonylamino or benzoylamino groups, and furthermore those in which A is a disulphophenyl radical, in particular a 2,4- or 2,5-disulphophenyl radical, as well as those in which A is a 1-naphthyl or 2-naphthyl radical which contains 1 to 3 sulphonic acid groups, in particular a trisulphonaphth-2-yl radical, such as 3,6,8- and 4,6,8-trisulphonaphth-2-yl.

Dyestuffs in which B is a 1,4-linked naphthylene radical which contains a sulphonic acid group in the ring which does not carry the azo bridges and can be substituted in the ring which carries the azo bridges by a $C_1$ to $C_4$-alkoxy group, and dyestuffs in which C is a 1,4-linked phenyl radical in which 1 or 2 of the radicals $R_1$–$R_4$ represent a $C_1$ to $C_4$-alkyl and/or alkoxy radical, in particular methyl- and/or methoxy, and the rest of the radicals $R_1$–$R_4$ represent hydrogen, and in particular dyestuffs in which C has the following meaning

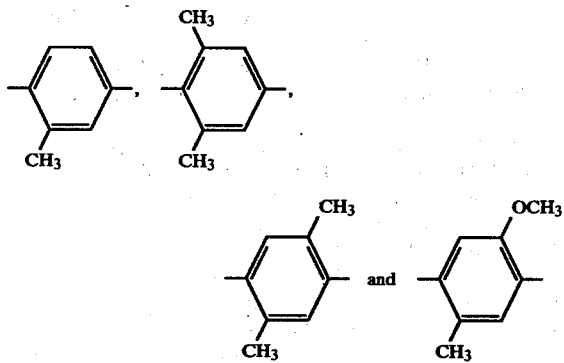

are also preferred.

Finally, quite generally, dyestuffs in which $R_5$ and $R_7$ is hydrogen, and dyestuffs in which D is a 2-sulphophenyl radical which can be optionally substituted by sulpho, carboxyl, $C_1$ to $C_4$-alkyl, $C_1$ to $C_4$-alkoxy, halogen, in particular chlorine, $C_1$ to $C_4$-alkylcarbonylamino or benzoylamino groups, are preferred.

The fibre-reactive dyestuffs according to the invention are prepared, for example, (a) either by reacting a disazo dyestuff (7) containing amino groups with 2,4,6-trifluoro-1,3,5-triazine and then subjecting the product to a condensation reaction with a compound $R_6$-H, for example:

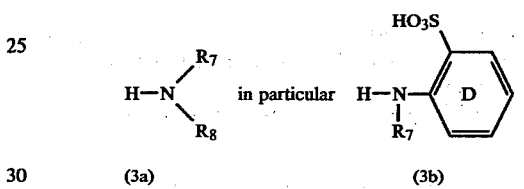

or a compound

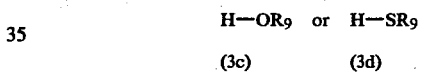

(b) or by reacting 2,4,6-trifluoro-1,3,5-triazine with (3a), (3b), (3c) or (3d) and then subjecting the product to a condensation reaction with a disazo dyestuff (7) containing amino groups, $R_6$–$R_9$ having the abovementioned meaning.

Examples of suitable compounds (3a) are ammonia, methylamine, dimethylamine, ethylamine, diethylamine, isopropylamine, butylamine, dibutylamine, sec.-butylamine, isobutylamine, diisobutylamine, tert.-butylamine, allylamine, diallylamine, methoxyethylamine, sulphatoethylamine, methoxypropylamine, ethoxypropylamine, carboxymethylamine, N-methyl-N-carboxymethylamine, carboxyethylamine, carboxypropylamine, N-methyl-N-sulphomethylamine, sulphoethylamine, N-methyl-N-sulphoethylamine, cyclohexylamine, N-methylcyclohexylamine, N-ethylcyclohexylamine, dicyclohexylamine, 2-. 3- or 4-methylcyclohexylamine, tetrahydro-3-thiopheneamine 1,1-dioxide, pyrrolidine, piperidine, 2-methylpiperidine, hexamethyleneimine, 1-methylpiperazine, morpholine, 4-morpholineamine, benzylamine, N-methylbenzylamine, dibenzylamine and aniline, optionally substituted by methyl, methoxy or chlorine.

Examples of suitable compounds (3b) are: 2-aminobenzenesulphonic acid, 2-amino-4- or -5-chlorobenzenesulphonic acid, 3- or 4-acetylamino-2-aminobenzenesulphonic acid, 2-amino-5-chloro-3-methylbenzenesulphonic acid, 2-amino-5-chloro-4-methylbenzenesulphonic acid, 2-amino-3,5-dimethylbenzenesulphonic acid, 2-amino-5-methoxy- or ethoxybenzenesulphonic acid, 4-amino-1,3-benzenedisulphonic acid, 2-amino- 1,4-benzenedisulphonic acid and 4-amino-3-sulphobenzoic acid.

The disazo dyestuff containing amino groups is prepared by conventional processes by diazotising a phenylamine or naphthylamine of the formula (4):

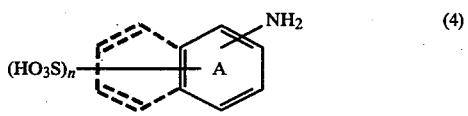

and coupling the diazotisation product to a naphthylamine of the formula (5):

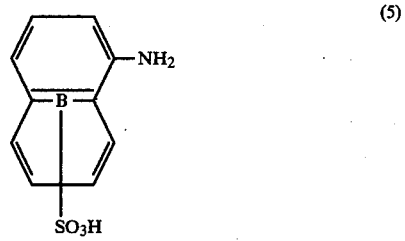

further diazotising the coupling product, and coupling the diazotisation product to an aniline derivative of the formula (6):

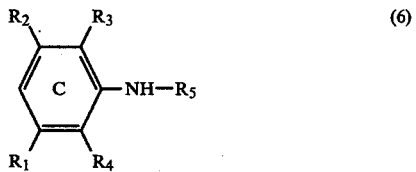

to give a disazo dyestuff of the formula (7):

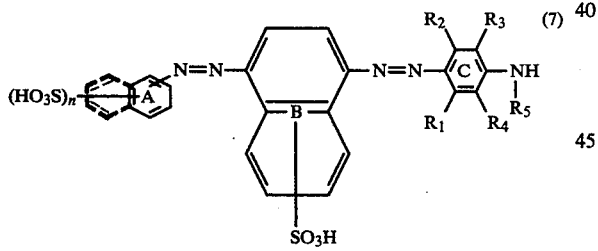

wherein
n and $R_1-R_5$ have the abovementioned meaning.

Examples of suitable aromatic amines of the formula (4) are: aniline-2-, -3- or -4-sulphonic acid, aniline-2,4-, -2,5- or 3,5-disulphonic acid, 4- or 5-chloroaniline-2-sulphonic acid, 4,6-dichloroaniline-2-sulphonic acid, 4- or 6-chloroaniline-3-sulphonic acid, 2-chloroaniline- or 2,5-dichloroaniline-4-sulphonic acid, 4- or 5-sulpho-2-aminobenzoic acid, 4-(acetylamino- or methyl- or methoxy)-aniline-2-sulphonic acid, 3-acetylamino-aniline-2-sulphonic acid, 2- or 3-methylaniline-4-sulphonic acid, 2-(methyl- or methoxy)-aniline-3-sulphonic acid, 1-naphthylamine-2-, -3-, 4-, -5-, -6-, -7- or -8-sulphonic acid, 2-naphthylamine-1-, -5-, -6-, -7- or -8-sulphonic acid, 1-naphthylamine-2,4-, -3,6-, -3,7-, -3,8-, -4,6-, -4,7-, -b 4,8-, -5,7- or -6,8-disulphonic acid, 2-naphthylamine-1,5-, -3,6-, -3,7-, -4,8-, -5,7- or -6,8-disulphonic acid, 1-naphthylamine-2,4,6-, -2,4,7-, -3,6,8- or -4,6,8-trisulphonic acid and 2-naphthylamine-1,5,7-, -3,6,8- or -4,6,8-trisulphonic acid.

Examples of suitable naphthylamines of the formula (5) are: 1-naphthylamine-6-, -7- or -8-sulphonic acid, 1-amino-2-ethoxynaphthalene-6-sulphonic acid, 1-amino-2-(naphthoxyacetic acid)-6-sulphonic acid and 1-amino-2-ethoxynaphthalene-7-sulphonic acid.

Suitable compounds of the formula (6) are: aniline, N-methylaniline, N-ethylaniline, N-butylaniline, 2- or 3-methylaniline, N,2-dimethylaniline, N-ethyl-2- or -3-methylaniline, N-butyl-3-methylaniline, 2-ethylaniline, 2,3-, 2,5-, 2,6- or 3,5-dimethylaniline, 2,3,5-trimethylaniline, 2- or 3-methoxy- or ethoxy-aniline, 2-methyl-5-methoxyaniline, 2-methoxy-5-methylaniline, 2-ethoxy-5-methylaniline, 2,5-dimethoxyaniline and 2,5-diethoxyaniline.

The dyestuffs, and dyestuff intermediate products, according to the invention are preferably prepared in an aqueous solution. The reactions with 2,4,6-trifluoro-1,3,5-triazine are carried out at a weakly acid to weakly alkaline pH value and at low temperature. The hydrofluoric acid liberated during the condensation reaction is neutralised by adding dilute alkali metal hydroxide, carbonate or bicarbonate solution.

The diazotisation of the aromatic amine of the formula (4) is carried out by the action of nitrous acid in an aqueous-mineral acid solution at low temperature. The coupling to naphthylamine of the formula (5) is carried out in the acid pH range. After the coupling has ended, the monoazo dyestuff, containing amino groups, thus obtained can be further diazotised without intermediate isolation. The second coupling to an aniline derivative of the formula (6) also proceeds in an acid pH range. After the second coupling has ended, the subsequent reaction with 2,4,6-trifluoro-1,3,5-triazine and the final condensation reaction with (3a), (3b), (3c) or (3d), or the reaction with a difluorotriazine of the formula

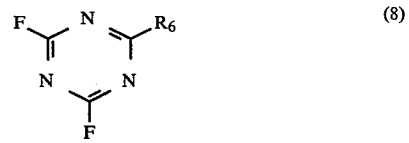

can be carried out without intermediate isolation of the disazo dyestuff. The monofluorotriazine dyestuffs according to the invention are suitable for dyeing and printing various materials, such as, for example, wool, polyamide and leather, but in particular cellulose-containing materials, such as linen, viscose staple and regenerated cellulose, but above all cotton.

EXAMPLE 1

86 parts of aniline-2,5-disulphonic acid are dissolved in 400 parts of water, with the addition of sodium hydroxide solution, to give a neutral solution. 100 parts of 30% strength hydrochloric acid and 70 parts of 30% strength nitrite solution are added rapidly at about 0° C., whilst stirring vigorously. 65 parts of 1-naphthylamine-6-sulphonic acid are introduced into the diazo solution thus obtained. The mixture is slowly adjusted to pH 4 with dilute sodium hydroxide solution. The coupling reaction ends rapidly. The temperature is 10°-15° C.

The monoazo dyestuff, which has partially precipitated, is dissolved with sodium hydroxide solution to form a neutral solution. 70 parts of 30% strength sodium nitrite solution are added and the reaction mixture is poured into a mixture of 100 parts of 30% strength hydrochloric acid and 100 parts of crushed ice. 31 parts of m-toluidine are slowly added dropwise to the diazo solution thus obtained. A pH value of 2-3 is maintained with dilute sodium hydroxide solution until the coupling has ended. The final volume is about 1.4 liters.

The disazo dyestuff, which has partially precipitated, is dissolved with sodium hydroxide solution to form a neutral solution.

At the same time, 55 parts of aminobenzene-2-sulphonic acid are dissolved in 400 parts of water, with the addition of sodium carbonate, to form a neutral solution. 28.5 parts by volume of 2,4,6-trifluoro-1,3,5-triazine are rapidly added dropwise at 0° C., whilst stirring vigorously. A pH value of 5-6.5 is maintained by simultaneously adding aqueous sodium carbonate solution. The reaction ends rapidly and the condensation product forms a milky suspension. (It has proved suitable to add a small amount of an unreactive emulsifier during the reaction). The neutral solution of the disazo dyestuff described above is slowly poured into this suspension. The temperature rises to 20° C. A pH value of 6-7 is maintained with aqueous sodium carbonate solution.

After the reaction, which can be followed by chromatography, has ended, the dyestuff is isolated by adding salt. After drying the product in vacuo and grinding it, a brown dyestuff powder is obtained which dyes cotton in fast orange-brown shades from an aqueous liquor.

EXAMPLE 2

111 parts of 2-aminonaphthalene-4,6,8-trisulphonic acid are stirred in 200 parts of water and 200 parts of crushed ice and are diazotised with 70 parts of 30% strength nitrite solution. Thereafter, 65 parts of 1-naphthylamine-6-sulphonic acid are introduced. The pH is slowly adjusted to 4 with dilute sodium hydroxide solution. The coupling reaction ends very rapidly. The temperature is 5°-10° C. The monoazo dyestuff is further diazotised directly with 100 parts of 30% strength hydrochloric acid and 70 parts of 30% strength nitrite solution. 31 parts of m-toluidine are slowly added dropwise to the disazo solution thus obtained. A pH value of 2-3 is maintained with dilute sodium hydroxide solution until the coupling has ended. The final volume is about 1.4 liters. The disazo dyestuff solution is neutralised with sodium hydroxide solution.

At the same time, 55 parts of aminobenzene-2-sulphonic acid are reacted with 28.5 parts by volume of 2,4,6-trifluoro-1,3,5-triazine as in Example 1, and the product is subjected to a condensation reaction with the neutral solution of the disazo dyestuff described above, as in Example 1. After the reaction has ended, the dyestuff is isolated by adding salt. After drying and grinding the product, a dark brown dyestuff powder is obtained which dyes cotton in fast, red-brown shades from an aqueous liquor.

Further examples are listed in the table which follows. They are prepared analogously to Example 1 or 2. Valuable dyestuffs are obtained, which have, on cellulose fibres, the shade indicated. The compounds $R_6$-H employed are indicated in column 5.

| Example | Diazo component formula (4) | Middle component formula (5) | Final component formula (6) | $R_6$—H | Colour shade on cellulose |
|---|---|---|---|---|---|
| 1 | Aniline-2,5-disulphonic acid | 1-Naphthylamine-6-sulphonic acid | 3-Methylaniline | 2-Aminobenzene-sulphonic acid | orange-brown |
| 2 | 2-Naphthylamine-4,6,8-trisulphonic acid | 1-Naphthylamine-6-sulphonic acid | 3-Methylaniline | 2-Aminobenzene-sulphonic acid | red-brown |
| 3 | Aniline-2,4-disulphonic acid | 1-Naphthylamine-6-sulphonic acid | 3-Methylaniline | 2-Aminobenzene-sulphonic acid | orange-brown |
| 4 | 2-Naphthylamine-4,8-disulphonic acid | 1-Naphthylamine-6-sulphonic acid | 3-Methylaniline | 2-Aminobenzene-sulphonic acid | red-brown |
| 5 | 2-Naphthylamine-6,8-disulphonic acid | 1-Naphthylamine-6-sulphonic acid | 3-Methylaniline | 2-Aminobenzene-sulphonic acid | red-brown |
| 6 | 2-Naphthylamine-5,7-disulphonic acid | 1-Naphthylamine-6-sulphonic acid | 3-Methylaniline | 2-Aminobenzene-sulphonic acid | red-brown |
| 7 | 2-Naphthylamine-3,6-trisulphonic acid | 1-Naphthylamine-6-sulphonic acid | 3-Methylaniline | 2-Aminobenzene-sulphonic acid | red-brown |
| 8 | Aniline-2,4-disulphonic acid | 1-Naphthylamine-6-sulphonic acid | 3,5-Dimethylaniline | 2-Aminobenzene-sulphonic acid | yellow-brown |
| 9 | Aniline-2,5-disulphonic acid | 1-Naphthylamine-6-sulphonic acid | 3,5-Dimethylaniline | 2-Aminobenzene-sulphonic acid | yellow-brown |
| 10 | 2-Naphthylamine-3,6-trisulphonic acid | 1-Naphthylamine-6-sulphonic acid | 3,5-Dimethylaniline | 2-Aminobenzene-sulphonic acid | red-brown |
| 11 | 2-Naphthylamine-4,6,8-trisulphonic acid | 1-Naphthylamine-6-sulphonic acid | 3,5-Dimethylaniline | 2-Aminobenzene-sulphonic acid | red-brown |
| 12 | 2-Naphthylamine-4,6,8-trisulphonic acid | 1-Napthylamine-6-sulphonic acid | 3-Methylaniline | 2-Amino-5-chlorobenzene-sulphonic acid | red-brown |
| 13 | Aniline-2,4-disulphonic acid | 1-Naphthylamine-6-sulphonic acid | 2,5-Dimethylaniline | 2-Aminobenzene-sulphonic acid | yellow-brown |
| 14 | Aniline-2,5-disulphonic acid | 1-Naphthylamine-6-sulphonic acid | 2,5-Dimethylaniline | 2-Aminobenzene-sulphonic acid | yellow-brown |
| 15 | 2-Naphthylamine-4,8-disulphonic acid | 1-Naphthylamine-6-sulphonic acid | 2,5-Dimethylaniline | 2-Aminobenzene-sulphonic acid | red-brown |

-continued

| Example | Diazo component formula (4) | Middle component formula (5) | Final component formula (6) | $R_6$—H | Colour shade on cellulose |
|---|---|---|---|---|---|
| 16 | 2-Naphthylamine-6,8-disulphonic acid | 1-Naphthylamine-6-sulphonic acid | 2,5-Dimethylaniline | 2-Aminobenzene-sulphonic acid | red-brown |
| 17 | 2-Naphthylamine-5,7-disulphonic acid | 1-Naphthylamine-6-sulphonic acid | 2,5-Dimethylaniline | 2-Aminobenzene-sulphonic acid | red-brown |
| 18 | 2-Naphthylamine-3,6,8-trisulphonic acid | 1-Naphthylamine-6-sulphonic acid | 2,5-Dimethylaniline | 2-Aminobenzene-sulphonic acid | red-brown |
| 19 | 2-Naphthylamine-4,6,8-trisulphonic acid | 1-Naphthylamine-6-sulphonic acid | 2,5-Dimethylaniline | 2-Aminobenzene-sulphonic acid | red-brown |
| 20 | Aniline-2,4-disulphonic acid | 1-Naphthylamine-6-sulphonic acid | 2-Methoxy-5-methyl-aniline | 2-Aminobenzene-sulphonic acid | red-brown |
| 21 | Aniline-2,5-disulphonic acid | 1-Naphthylamine-6-sulphonic acid | 2-Methoxy-5-methyl-aniline | 2-Aminobenzene-sulphonic acid | red-brown |
| 22 | 2-Naphthylamine-4,8-disulphonic acid | 1-Naphthylamine-6-sulphonic acid | 2-Methoxy-5-methyl-aniline | 2-Aminobenzene-sulphonic acid | red-brown |
| 23 | 2-Naphthylamine-6,8-disulphonic acid | 1-Naphthylamine-6-sulphonic acid | 2-Methoxy-5-methyl-aniline | 2-Aminobenzene-sulphonic acid | red-brown |
| 24 | 2-Naphthylamine-5,7-disulphonic acid | 1-Naphthylamine-6-sulphonic acid | 2-Methoxy-5-methyl-aniline | 2-Aminobenzene-sulphonic acid | red-brown |
| 25 | 2-Naphthylamine-3,6,8-trisulphonic acid | 1-Naphthylamine-6-sulphonic acid | 2-Methoxy-5-methyl-aniline | 2-Aminobenzene-sulphonic acid | red-brown |
| 26 | 2-Naphthylamine-4,6,8-trisulphonic acid | 1-Naphthylamine-6-sulphonic acid | 2-Methoxy-5-methyl-aniline | 2-Aminobenzene-sulphonic acid | red-brown |
| 27 | 2-Naphthylamine-4,8-disulphonic acid | 1-Naphthylamine-6-sulphonic acid | 3,5-Dimethylaniline | 2-Aminobenzene-sulphonic acid | red-brown |
| 28 | 2-Naphthylamine-6,8-disulphonic acid | 1-Naphthylamine-6-sulphonic acid | 3,5-Dimethylaniline | 2-Aminobenzene-sulphonic acid | red-brown |
| 29 | 2-Naphthylamine-5,7-disulphonic acid | 1-Naphthylamine-6-sulphonic acid | 3,5-Dimethylaniline | 2-Aminobenzene-sulphonic acid | red-brown |
| 30 | Aniline-2,5-disulphonic acid | 1-Amino-2-ethoxy-naphthalene-6-sulphonic acid | 3-Methylaniline | 2-Aminobenzene-sulphonic acid | red-brown |
| 31 | 2-Naphthylamine-4,6,8-trisulphonic acid | 1-Amino-2-ethoxy-naphthalene-6-sulphonic acid | 3-Methylaniline | 2-Aminobenzene-sulphonic acid | red-brown |
| 32 | 1-Naphthylamine-3,6-disulphonic acid | 1-Naphthylamine-6-sulphonic acid | 3-Methylaniline | 2-Aminobenzene-sulphonic acid | red-brown |
| 33 | 1-Naphthylamine-4,7-disulphonic acid | 1-Naphthylamine-6-sulphonic acid | 3-Methylaniline | 2-Aminobenzene-sulphonic acid | red-brown |
| 34 | Aniline-2,5-disulphonic acid | 1-Naphthylamine-6-sulphonic acid | 3-Methylaniline | Ammonia | orange-brown |
| 35 | Aniline-2,5-disulphonic acid | 1-Naphthylamine-6-sulphonic acid | 3-Methylaniline | Diethylamine | orange-brown |
| 36 | Aniline-2,5-disulphonic acid | 1-Naphthylamine-6-sulphonic acid | 3-Methylaniline | Sulphatoethyl-amine | orange-brown |
| 37 | Aniline-2,5-disulphonic acid | 1-Naphthylamine-6-sulphonic acid | 3-Methylaniline | Sarcosine | orange-brown |
| 38 | Aniline-2,5-disulphonic acid | 1-Naphthylamine-6-sulphonic acid | 3-Methylaniline | Glycine | orange-brown |
| 39 | Aniline-2,5-disulphonic acid | 1-Naphthylamine-6-sulphonic acid | 3-Methylaniline | β-Alanine | orange-brown |
| 40 | Aniline-2,5-disulphonic acid | 1-Naphthylamine-6-sulphonic acid | 3-Methylaniline | Taurine | orange-brown |
| 41 | Aniline-2,5-disulphonic acid | 1-Naphthylamine-6-sulphonic acid | 3-Methylaniline | Methyltaurine | orange-brown |
| 42 | Aniline-2,5-disulphonic acid | 1-Naphthylamine-6-sulphonic acid | 3-Methylaniline | Pyrrolidine | orange-brown |
| 43 | Aniline-2,5-disulphonic acid | 1-Naphthylamine-6-sulphonic acid | 3-Methylaniline | Morpholine | orange-brown |
| 44 | Aniline-2,5-disulphonic acid | 1-Naphthylamine-6-sulphonic acid | 3-Methylaniline | Benzylamine | orange-brown |
| 45 | Aniline-2,5-disulphonic acid | 1-Naphthylamine-6-sulphonic acid | 3-Methylaniline | Piperidine | orange-brown |
| 46 | Aniline-2,5-disulphonic acid | 1-Naphthylamine-6-sulphonic acid | 3-Methylaniline | Aniline | orange-brown |
| 47 | Aniline-2,5-disulphonic acid | 1-Napthylamine-6-sulphonic acid | 3-Methylaniline | 4-Aminobenzoic acid | orange-brown |

-continued

| Example | Diazo component formula (4) | Middle component formula (5) | Final component formula (6) | $R_6$—H | Colour shade on cellulose |
|---|---|---|---|---|---|
| 48 | 2-Naphthylamine-4,8-disulphonic acid | 1-Naphthylamine-6-sulphonic acid | 3-Methylaniline | Ammonia | red-brown |
| 49 | 2-Naphthylamine-4,8-disulphonic acid | 1-Naphthylamine-6-sulphonic acid | 3-Methylaniline | Dimethylamine | red-brown |
| 50 | 2-Naphthylamine-4,8-disulphonic acid | 1-Naphthylamine-6-sulphonic acid | 3-Methylaniline | Sulphatoethylamine | red-brown |
| 51 | 2-Naphthylamine-4,8-disulphonic acid | 1-Naphthylamine-6-sulphonic acid | 3-Methylaniline | Sarcosine | red-brown |
| 52 | 2-Naphthylamine-4,8-disulphonic acid | 1-Naphthylamine-6-sulphonic acid | 3-Methylaniline | Glycine | red-brown |
| 53 | 2-Naphthylamine-4,8-disulphonic acid | 1-Naphthylamine-6-sulphonic acid | 3-Methylaniline | Methylaminomethanesulphonic acid | red-brown |
| 54 | 2-Naphthylamine-4,8-disulphonic acid | 1-Naphthylamine-6-sulphonic acid | 3-Methylaniline | Taurine | red-brown |
| 55 | 2-Naphthylamine-4,8-disulphonic acid | 1-Naphthylamine-6-sulphonic acid | 3-Methylaniline | Methyltaurine | red-brown |
| 56 | 2-Naphthylamine-4,8-disulphonic acid | 1-Naphthylamine-6-sulphonic acid | 3-Methylaniline | Piperidine | red-brown |
| 57 | 2-Naphthylamine-4,8-disulphonic acid | 1-Naphthylamine-6-sulphonic acid | 3-Methylaniline | Pyrrolidine | red-brown |
| 58 | 2-Naphthylamine-4,8-disulphonic acid | 1-Naphthylamine-6-sulphonic acid | 3-Methylaniline | Morpholine | red-brown |
| 59 | 2-Naphthylamine-4,8-disulphonic acid | 1-Naphthylamine-6-sulphonic acid | 3-Methylaniline | Benzylamine | red-brown |
| 60 | 2-Naphthylamine-4,8-disulphonic acid | 1-Naphthylamine-6-sulphonic acid | 3-Methylaniline | Aniline | red-brown |
| 61 | 2-Naphthylamine-4,8-disulphonic acid | 1-Naphthylamine-6-sulphonic acid | 3-Methylaniline | 4-Aminobenzenesulphonic acid | red-brown |
| 62 | 2-Naphthylamine-4,6,8-trisulphonic acid | 1-Naphthylamine-6-sulphonic acid | 3-Methylaniline | Ammonia | red-brown |
| 63 | 2-Naphthylamine-4,6,8-trisulphonic acid | 1-Naphthylamine-6-sulphonic acid | 3-Methylaniline | Ethanol | red-brown |
| 64 | 2-Naphthylamine-4,6,8-trisulphonic acid | 1-Naphthylamine-6-sulphonic acid | 3-Methylaniline | Sulphatoethylamine | red-brown |
| 65 | 2-Naphthylamine-4,6,8-trisulphonic acid | 1-Naphthylamine-6-sulphonic acid | 3-Methylaniline | Sarcosine | red-brown |
| 66 | 2-Naphthylamine-4,6,8-trisulphonic acid | 1-Naphthylamine-6-sulphonic acid | 3-Methylaniline | Glycine | red-brown |
| 67 | 2-Naphthylamine-4,6,8-trisulphonic acid | 1-Naphthylamine-6-sulphonic acid | 3-Methylaniline | Methylaminomethanesulphonic acid | red-brown |
| 68 | 2-Naphthylamine-4,6,8-trisulphonic acid | 1-Naphthylamine-6-sulphonic acid | 3-Methylaniline | Taurine | red-brown |
| 69 | 2-Naphthylamine-4,6,8-trisulphonic acid | 1-Naphthylamine-6-sulphonic acid | 3-Methylaniline | Methyltaurine | red-brown |
| 70 | 2-Naphthylamine-4,6,8-trisulphonic acid | 1-Naphthylamine-6-sulphonic acid | 3-Methylaniline | Piperidine | red-brown |
| 71 | 2-Naphthylamine-4,6,8-trisulphonic acid | 1-Naphthylamine-6-sulphonic acid | 3-Methylaniline | Pyrrolidine | red-brown |
| 72 | 2-Naphthylamine-4,6,8-trisulphonic acid | 1-Naphthylamine-6-sulphonic acid | 3-Methylaniline | Morpholine | red-brown |
| 73 | 2-Naphthylamine-4,6,8-trisulphonic acid | 1-Naphthylamine-6-sulphonic acid | 3-Methylaniline | Benzylamine | red-brown |
| 74 | 2-Naphthylamine-4,6,8-trisulph | 1-Naphthylamine-6-sulphonic acid | 3-Methylaniline | Benzyl alcohol | red-brown |

| Example | Diazo component formula (4) | Middle component formula (5) | Final component formula (6) | $R_6$—H | Colour shade on cellulose |
|---|---|---|---|---|---|
| 75 | 2-Naphthylamine-4,6,8-trisulphonic acid | 1-Naphthylamine-6-sulphonic acid | 3-Methylaniline | Aniline | red-brown |

I claim:

1. Fibre-reactive disazo dyestuffs of the formula

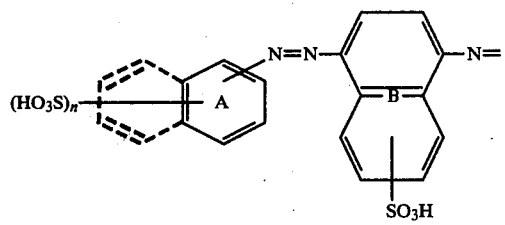

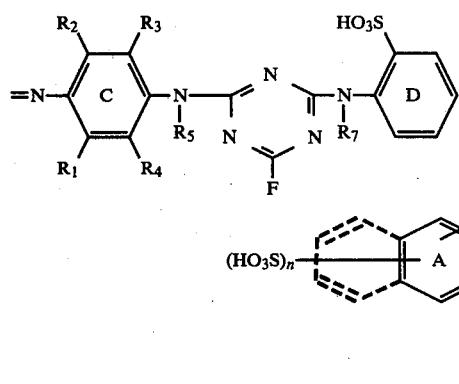

wherein $R_1$ to $R_4$ independently of one another denote hydrogen, a low-molecular alkyl group or a low-molecular alkoxy group, $R_5$ denotes hydrogen or a low-molecular alkyl group
n is 1, 2 or 3 and
$R_7$ denotes hydrogen, low-molecular alkyl, aryl, aralkyl, or cycloalkyl, and
the benzene or naphthalene ring A in addition to the sulfonic acid groups, can be substituted by $C_1$-$C_4$-alkyl, $C_1$-$C_4$ alkoxy, carboxyl, halogen, $C_1$-$C_4$-alkylcarbonylamino or benzoyl amino;
the naphthalene ring B in addition to the sulfonic acid group can be $C_1$-$C_4$-alkoxy substituted and the benzene radical D in addition to the sulfonic acid group in 2-position can be substituted by one sulfo or carboxyl group, by $C_1$-$C_4$ alkyl, $C_1$-$C_4$ alkoxy, halogen, $C_1$-$C_4$-alkylcarbonylamino or benzoylamino groups.

2. Fibre-reactive disazo dyestuffs of the formula

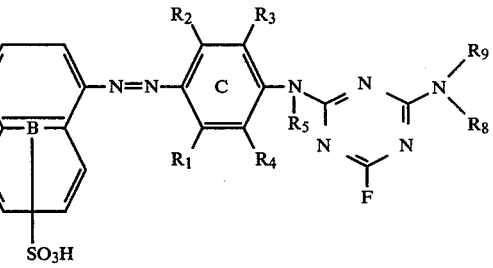

wherein
$R_1$ to $R_5$ have the meaning given in claim 1 and $R_8$ and $R_9$ together form a 5-membered or 6-membered ring.

3. Fibre-reactive disazo dyestuffs of the formula

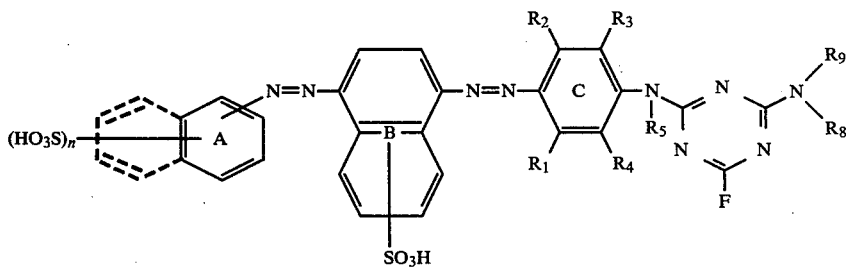

wherein
$R_1$ to $R_5$ have the meaning given in claim 1 and $R_8$ and $R_9$ together form a 5-membered or 6-membered ring containing oxygen.

* * * * *